United States Patent

Montgomery et al.

(10) Patent No.: US 7,681,644 B2
(45) Date of Patent: Mar. 23, 2010

(54) MANAGING LOST RETURNS IN A WELLBORE

(75) Inventors: John K. Montgomery, Houston, TX (US); Stuart R. Keller, Houston, TX (US); Nancy M. Krahel, Katy, TX (US); Martin V. Smith, Friendswood, TX (US); Robert S. Williamson, Montrose (GB)

(73) Assignee: ExxonMobil Upstream Research Company, Houston, TX (US)

( * ) Notice: Subject to any disclaimer, the term of this patent is extended or adjusted under 35 U.S.C. 154(b) by 45 days.

(21) Appl. No.: 11/983,061

(22) Filed: Nov. 6, 2007

(65) Prior Publication Data

US 2008/0110621 A1 May 15, 2008

Related U.S. Application Data

(60) Provisional application No. 60/858,564, filed on Nov. 13, 2006.

(51) Int. Cl.
*E21B 43/267* (2006.01)
*E21B 37/00* (2006.01)

(52) U.S. Cl. .................. 166/280.1; 166/279; 166/308.3; 166/312

(58) Field of Classification Search .................. None
See application file for complete search history.

(56) References Cited

U.S. PATENT DOCUMENTS

| | | | |
|---|---|---|---|
| 3,629,102 A | 12/1971 | Lummus | |
| 3,979,304 A | 9/1976 | Fischer et al. | |
| 3,979,305 A | 9/1976 | Fischer et al. | |
| 4,192,753 A | 3/1980 | Pye et al. | |
| 4,411,800 A | 10/1983 | Green et al. | |
| 4,428,844 A | 1/1984 | Wagener | |
| 4,614,599 A | 9/1986 | Walker | |
| 4,809,783 A * | 3/1989 | Hollenbeck et al. ......... 166/307 |

(Continued)

FOREIGN PATENT DOCUMENTS

EP 0 673 984 A1 9/1995

(Continued)

OTHER PUBLICATIONS

F. E. Dupriest, "Fracture Closure Stress (FCS) and Lost Returns Practices" SPE 92192, 2005 SPE/IADC Drilling Conference, Feb. 23-25, 2005, pp. 1-11, Amsterdam, The Netherlands.

(Continued)

*Primary Examiner*—Zakiya W. Bates

(57) ABSTRACT

A method of managing lost returns in a wellbore includes contacting a filter cake with a treating fluid to remove metallic weighting agents from the filter cake, wherein the filter cake is disposed on a face of a formation fracture in the wellbore. The method also includes contacting the filter cake with a proppant slurry, wherein the proppant slurry contacts the filter cake concurrently with the treating fluid or after the treating fluid contacts the filter cake. This method may include increasing the filter cake permeability and may utilize a barite removal agent, such as a chelation agent. At least one related wellbore management method creates a fracture in the wellbore and props open the fracture to increase wellbore integrity to utilize higher weight drilling fluids and prevent fractures from forming further down the wellbore.

24 Claims, 7 Drawing Sheets

U.S. PATENT DOCUMENTS

| | | | |
|---|---|---|---|
| 5,247,992 | A | 9/1993 | Lockhart |
| 5,415,230 | A | 5/1995 | Fisk, Jr. et al. |
| 5,555,937 | A | 9/1996 | Fisk, Jr. et al. |
| 5,671,810 | A | 9/1997 | Hodge et al. |
| 5,700,767 | A | 12/1997 | Adams |
| 6,209,643 | B1 | 4/2001 | Nguyen et al. |
| 6,267,186 | B1 | 7/2001 | Hayatdavoudi |
| 6,746,611 | B2 | 6/2004 | Davidson |
| 6,830,105 | B2 | 12/2004 | Thesing |
| 6,938,693 | B2 | 9/2005 | Boney et al. |
| 6,968,898 | B2 | 11/2005 | Todd et al. |
| 7,018,955 | B2 | 3/2006 | Schilling et al. |
| 7,096,947 | B2 | 8/2006 | Todd et al. |
| 7,134,496 | B2 | 11/2006 | Jones et al. |
| 2004/0094300 | A1* | 5/2004 | Sullivan et al. .......... 166/308.1 |
| 2005/0178553 | A1* | 8/2005 | Harris ..................... 166/308.5 |
| 2007/0123433 | A1* | 5/2007 | Sarkar et al. ................ 507/213 |

FOREIGN PATENT DOCUMENTS

| | | |
|---|---|---|
| GB | 2 350 120 A | 11/2000 |
| WO | WO 94/09254 A1 | 4/1994 |
| WO | WO 96/01358 A1 | 1/1996 |
| WO | WO 01/83639 A2 | 11/2001 |
| WO | WO 03/029613 A1 | 4/2003 |
| WO | WO 03/036021 A2 | 5/2003 |
| WO | WO 2005/012687 A1 | 2/2005 |
| WO | WO 2005/047643 A1 | 5/2005 |

OTHER PUBLICATIONS

F. E. Dupriest, "Codifying fracture closure stress and lost returns practices, Rock mechanics concept increases integrity by widening fractures", *World Oil (Gulf Publishing)*, vol. 226, No. 10, Oct. 2005, pp. 23-30.

M. J. Economides and K. G. Nolte, "Chapter 10: Fracture Treatment Design", *Reservoir Stimulation*, 2006, pp. 10-21-10-24, Third Edition, Prentice Hall, New Jersey.

J. K. Fink, "Chapter 9: Filter-Cake Removal", *Oil Field Chemicals*, 2003, pp. 120-124, Gulf Professional Publishing-Elsevier Science, Burlington, Massachusetts.

J. K. Fink, "Chapter 17: Hydraulic Fracturing Fluids", *Oil Field Chemicals*, 2003, pp. 233-275, Gulf Professional Publishing-Elsevier Science, Burlington, Massachusetts.

J. K. Fink, "Chapter 23: Formation Damage Control and Remediation", *Oil Field Chemicals*, 2003, pp. 706-729, Gulf Professional Publishing-Elsevier Science, Burlington, Massachusetts.

J. K. Montgomery, "Improved Method for Use of Chelation to Free Stuck Pipe and Enhance Treatment of Lost Returns", SPE/IADC 105567, 2007 SPE/IADC Drilling Conference, Feb. 20-22, 2005, pp. 1-7, Amsterdam, The Netherlands.

H. A. Nasr-El Din et al., "Laboratory Studies of In-Situ Generated Acid to Remove Filter Cake in Gas Wells", SPE 96965, 2005 SPE Annual Technical Conference and Exhibition, Oct. 9-12, 2005, pp. 1-15, Dallas, Texas.

D. O. Shah, et al., "University of Florida Research Program on Chemical Oil Recovery Systems", Proceedings of Fourth DOE Symposium on Enhanced Oil & Gas Recovery & Improved Drilling Methods, Aug. 1978, pp. A 11/1-A 11/20, Gainesville, Florida.

B. Todd et al., "A Chemical "Trigger" Useful For Oilfield Applications", SPE 92709, 2005 SPE International Symposium on Oilfield Chemistry, Feb. 2-4, 2005, pp. 1-7, Houston, TX.

D. P. Vollmer et al., "Brine and Permeability Effects on Crosslinked Fluid-Loss Pill Filter-Cake Formation", SPE 93319, 2005 SPE International Symposium on Oilfield Chemistry, Feb. 2-4, 2005, pp. 1-5, Houston, TX.

"Filter Cake Removal." *Well Flow International*. 2000. Well Flow International. Oct. 11, 2006 <http://www.well-flow.com/filtercake.html>.

"Pipe Release Agents." *Well Flow International*. 2000. Well Flow International. Oct. 11, 2006 <http://www.well-flow.com/piperelease.html>.

European Search Report No. 114871, dated Jun. 5, 2007, for 2006EM168, 4 pages.

Howard, Siv K., "Formate Brines for Drilling and Completion: State of the Art", SPE 30498, SPE Annual Technical Conference, Oct. 22-25, 1995, pp. 483-496, Dallas, TX.

* cited by examiner

MANAGING LOST RETURNS IN A WELLBORE

CROSS-REFERENCE TO RELATED APPLICATIONS

This application claims the benefit of U.S. Provisional Application No. 60/858,564, filed Nov. 13, 2006.

FIELD

This invention relates generally to a method to enhance drilling and production operations from subsurface formations. More particularly, this invention relates to methods for selecting, preparing, and applying treating agents into a wellbore to manage the wellbore environment during drilling operations.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The production of hydrocarbons, such as oil and gas, has been performed for numerous years. To produce these hydrocarbons, a wellbore is typically drilled in intervals to reach a subsurface formation. Often, a filter cake is formed during drilling. Filter cake is a concentrated layer of solids from the drilling fluid that forms on the borehole wall opposite a permeable formation. It forms a screen or barrier between the formation and the wellbore, making fluid flow between the two areas more difficult.

Lost Returns

In a drilling operation, it is often possible for the circulating drilling fluid pressure to exceed the formation strength. When drilling pressure exceeds the formation strength, the formation cracks, or fractures and the drilling fluid flows into the formation through the fracture. This phenomenon is called lost returns. Lost returns can be costly due to the loss of drilling fluid, which has to be replaced for the drilling operations to resume. Lost returns may also result in a potentially hazardous event, such as a kick. A kick is an influx of formation fluid into the wellbore, which may cause damage to equipment and/or injury to operators and may cause flaring.

Lost returns is a common worldwide drilling problem that has significant costs due to lost drilling fluids, lost time, potential wellbore influx, and induced wellbore instability. Losses through propagated fractures constitute the overwhelming majority of lost returns in the industry (as opposed to vugular losses or seepage losses). Fracture Closure Stress (FCS) practices or methods have been developed to combat losses by utilizing a rock mechanics approach. See Dupriest, Fred E., *Fracture Closure Stress (FCS) and Lost Returns Practices*, SPE/IADC 92192 (2005). FCS is based on the idea that integrity is built in a formation by increasing the width of a fracture. This may be achieved with multiple approaches as varied as traditional LCM (lost circulation material), cement, polymers, or adhesive solids. The process of building integrity includes: (1) isolating the fracture tip from the wellbore so pressure can be applied to widen the fracture to increase its closing stress, and (2) building a width to a level that achieves a stress exceeding the wellbore pressure required to drill ahead. Isolation of the tip from wellbore pressure occurs when the LCM and barite lose sufficient carrier fluid to become immobile.

One issue with these stress building operations, especially in NADF (non-aqueous drilling fluid), is that very high fluid loss is needed to form the immobile mass in the fracture faces. If fluid loss is inadequate, the solids remain mobile, pressure continues to be transmitted to grow the tip and it is not possible to build pressure within the fracture to increase closing stress. The movement of these particles prevents the formation of the immovable mass and sometimes results in the slurry flowing back into the wellbore, called flowback.

Flowback prevention is a well-known issue in well stimulation operations. Some common flowback prevention techniques include: the use of a resin-coated proppant (See, e.g. K. H. NIMERICK, et. al., Compatibility of Resin-Coated Proppants with Crosslinked Fracturing Fluids, In Proceedings Volume, pp. 245-250, 65th Annual SPE Tech Conf (New Orleans, La., Sep. 23-26 1990)); the use of thermoplastic films (P. D. NGUYEN, et. al, Thermoplastic Film Prevents Proppant Flowback, Oil Gas J, 94(6): 60-62, (1996)); the addition of an adhesive coated material to the proppant (U.S. Pat. No. 5,582,249); and addition of magnetized materials to the proppant (U.S. Pat. No. 6,116,342).

A NADF is an invert emulsion with a non-aqueous base fluid (NABF) as the continuous phase and an aqueous fluid as the dispersed phase. The emulsion is stabilized by using surfactants. In addition, NADF consists of barite as a typical weighting agent. Note, the term "barite" is used throughout the application, but the term should be read to include the element barium and include particulate and other forms in which the element may be found. Other materials such as hematite or ilmenite are also used for increasing the weight of NADF. Fluid loss control agents such as colloidal solids are present in NADF. To improve the hole cleaning ability of NADF, viscosifiers such as organophillic clays are also used.

Lost returns are often difficult to treat in NADF due to the very low fluid losses achieved with most NADF filter cakes and the inability to dehydrate the solids. While the native permeability of the formation might allow rapid leakoff of the FCS fluid, a tight NADF filter cake on the fracture face prevents this from occurring. Some embodiments of the present techniques include a method to increase the permeability of the filter cake prior to the FCS treatment. By increasing the permeability of the filter cake on the fracture faces, greater leakoff occurs and an immobile mass is deposited.

Differential Pressure Sticking

Differential pressure sticking (DPS) is a common worldwide drilling problem that results in significant increases in non-productive time and overall well cost. Additionally, a DPS event may result in abandonment of a drilling operation at a particular hole and force a sidetrack. To mitigate DPS events, operators often minimize the overbalance (by decreasing mud weight), minimize stationary time, minimize drilled length through low pressure formations, increase drill collar and drill string stabilization, and optimize fluid properties in attempts to minimize the risk of sticking. However, despite the best efforts of operators a DPS event may still occur.

A common practice to free differentially stuck pipe is to pump a chemical "spotting" fluid. The purpose of the fluid is to dissolve or break down the filter cake so the pipe can be freed. Multiple spotting fluid options are available. Water-based drilling fluids (WBM) have engendered numerous spotting fluids that have been used successfully in the field.

These spotting fluids are typically composed of NADF (non-aqueous drilling fluid). Spotting fluids function by reducing the area of contact and may penetrate the filter cake and relieve pressure differential.

Often, operators may choose to use a NADF while drilling if the risk of a DPS event is high. This decreases the filter cake permeability and causes the pressure differential to develop more slowly upon embedment. Additionally, the filter cake is much slicker, thinner, and easier to shear—all factors that minimize the risk of a DPS event. While the use of a NADF may be sufficient to avoid DPS events, such events still occur. This is especially the case when the fluid incorporates bit-generated coarse solids that result in leaky and thick filter cakes exposed to unsupported drill collars. In the event of sticking when using a NADF, there are currently minimal available options to free a differentially stuck well tool or pipe.

Other related material may be found in at least International Patent App. WO 2005/047643 A1; International Patent App. WO 2005/012687 A1; and SPE/IADC Publication No. 92192.

SUMMARY

In one embodiment of a method associated with the present techniques, a method of managing lost returns in a wellbore is disclosed. The method includes contacting a filter cake with a treating fluid to remove metallic weighting agents from the filter cake, wherein the filter cake is disposed on a face of a formation fracture in the wellbore. The method also includes contacting the filter cake with a proppant slurry, wherein the proppant slurry contacts the filter cake concurrently with the treating fluid or after the treating fluid contacts the filter cake. This method may include increasing the filter cake permeability and may utilize a barite removal agent, such as a chelation agent.

A second embodiment of a method associated with the present techniques includes creating a fracture in a wellbore, wherein the wellbore wall includes a filter cake with a low permeability disposed thereon. Further, creating a fracture comprises pumping a mixture into the wellbore, the mixture comprising a proppant slurry and a treating fluid, wherein the treating fluid is capable of removing metallic weighting agents from the filter cake.

A second embodiment of a method associated with the present techniques includes forming a fracture in a formation, wherein a filter cake forms on a face of the fracture. It further includes treating the fracture, the treating comprising pumping a treating fluid over the filter cake on the face of the fracture, wherein the treating fluid is capable of removing metallic weighting agents from the filter cake, and pumping a proppant slurry into the fracture, wherein the treating fluid is pumped concurrently or prior to the proppant slurry. Then hydrocarbons are produced from the well.

BRIEF DESCRIPTION OF THE DRAWINGS

The foregoing and other advantages of the present techniques may become apparent upon reviewing the following detailed description and drawings in which.

DETAILED DESCRIPTION

Figure 1:
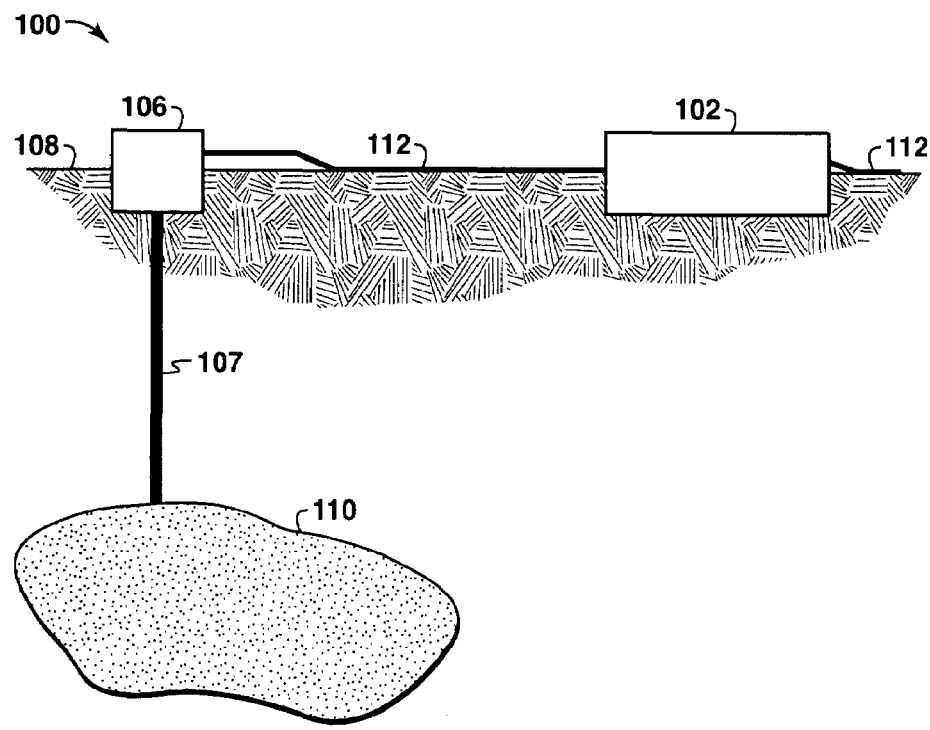
FIG. 1 is an illustration of an exemplary drilling system in accordance with certain aspects of the present techniques.

In the following detailed description section, the specific embodiments of the present techniques are described in connection with preferred embodiments. However, to the extent that the following description is specific to a particular embodiment or a particular use of the present techniques, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present techniques relates generally to methods to enhance drilling and production operations from subsurface formations. More particularly, this invention relates to methods for selecting, preparing, and applying treating agents into a wellbore to change filter cake permeability either proactively or in response to wellbore conditions.

Managing Lost Returns

Some embodiments of the present techniques are reactive and may be applied during a standard drilling operation in which a fracture forms in the wellbore and a filter cake forms on the face of the fracture. A treatment response is determined and if treatment is necessary, an operator may inject a treating fluid capable of removing barite or other metallic weighting agents from the filter cake, thereby increasing the permeability of the filter cake and injecting a proppant slurry. These steps may be repeated until the fracture is fully treated and normal drilling operations may be resumed until another fracture forms. In some formations, it may be necessary to change the wettability of the filter cake prior to increasing the permeability.

A significant volume component of a typical filter cake is comprised of barite. Hence, any treatment that removes barite from the filter cake has a significant impact on the filter cake properties. Barite is a popular weighting particle, but other metallic weighting particles may be used, such as hematite and ilmenite. Barite dissolvers have long been used in the industry to combat scale in downhole tubulars. Additionally, barite dissolvers have gained use as a means to treat formation damage from mud invasion because the primary weighting agent for drilling fluids is barite. Barite is extremely insoluble in most acids and typically requires specialized treatment fluids to remove, but may also be removed using potassium formate and other substances. Some embodiments of the present techniques relate to the use of treatment fluids including agents to remove barite or other metallic weighting agents that compose the filter cake.

Common chelation agents include EDTA (ethylenediamine tetraacetic acid), HEDTA (hydroxyethylenediamine triacetic acid), and DTPA (diethylenetriamine pentaacetic acid). Potassium formate may also be used to remove barite and other metallic weighting agents from filter cake. Similar compounds, variations, mixtures, and new treatment compounds are also being developed. The present techniques may be practiced using any compound having such an effect on filter cake permeability.

Referring to the drawings, FIG. 1 is an illustration of an exemplary drilling system 100 that may be used in accordance with certain aspects of the present techniques. In the exemplary drilling system 100, a drilling rig 106 is utilized to drill a well 104. The well 104 may penetrate the surface 108 of the Earth to reach the subsurface formation 110. As may be appreciated, the subsurface formation 110 may include various layers of rock that may or may not include hydrocarbons, such as oil and gas, and may be referred to as zones or intervals. As such, the well 104 may provide fluid flow paths between the subsurface formation 110 and production facilities 102 located at the surface 108. The production facilities 102 may process the hydrocarbons and transport the hydrocarbons to consumers. However, it should be noted that the drilling system 100 is illustrated for exemplary purposes and the present techniques may be useful in circulating fluids in a wellbore for any purpose, such as performing drilling operations or producing fluids from a subsurface location.

Figure 2A:
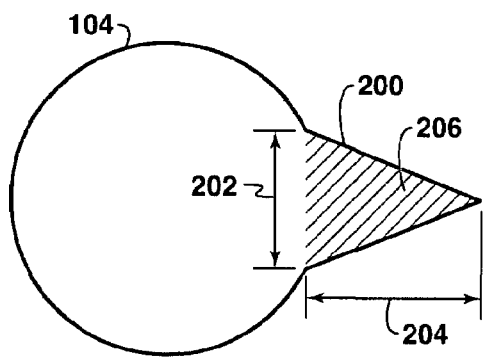
FIGS. 2A-2B are illustrations of an exemplary cross-section of a fracture in a wellbore.
Figure 2B:
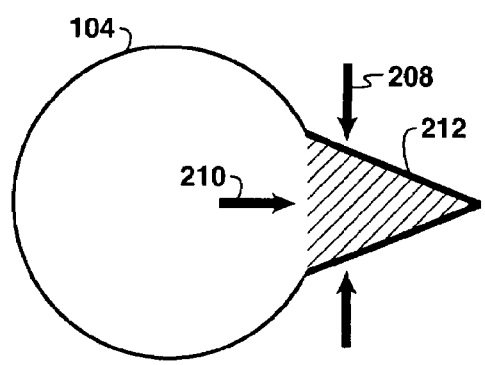

FIGS. 2A-2B are illustrations of a cross-sectional view of the well 104 of FIG. 1 including a fracture 200 therein. Accordingly, FIG. 2 may be best understood by concurrently viewing FIG. 1. FIG. 2A shows the width of the fracture 202, the length of the fracture 204, and proppant 206. The illustration is only intended to visually depict some of the concepts of the present techniques; it is not intended to be an accurate depiction of a wellbore fracture. FIG. 2B shows arrows depicting fracture closure stress 208, circulation pressure 210, and a filter cake disposed on the face of the fracture 212.

Figure 3:
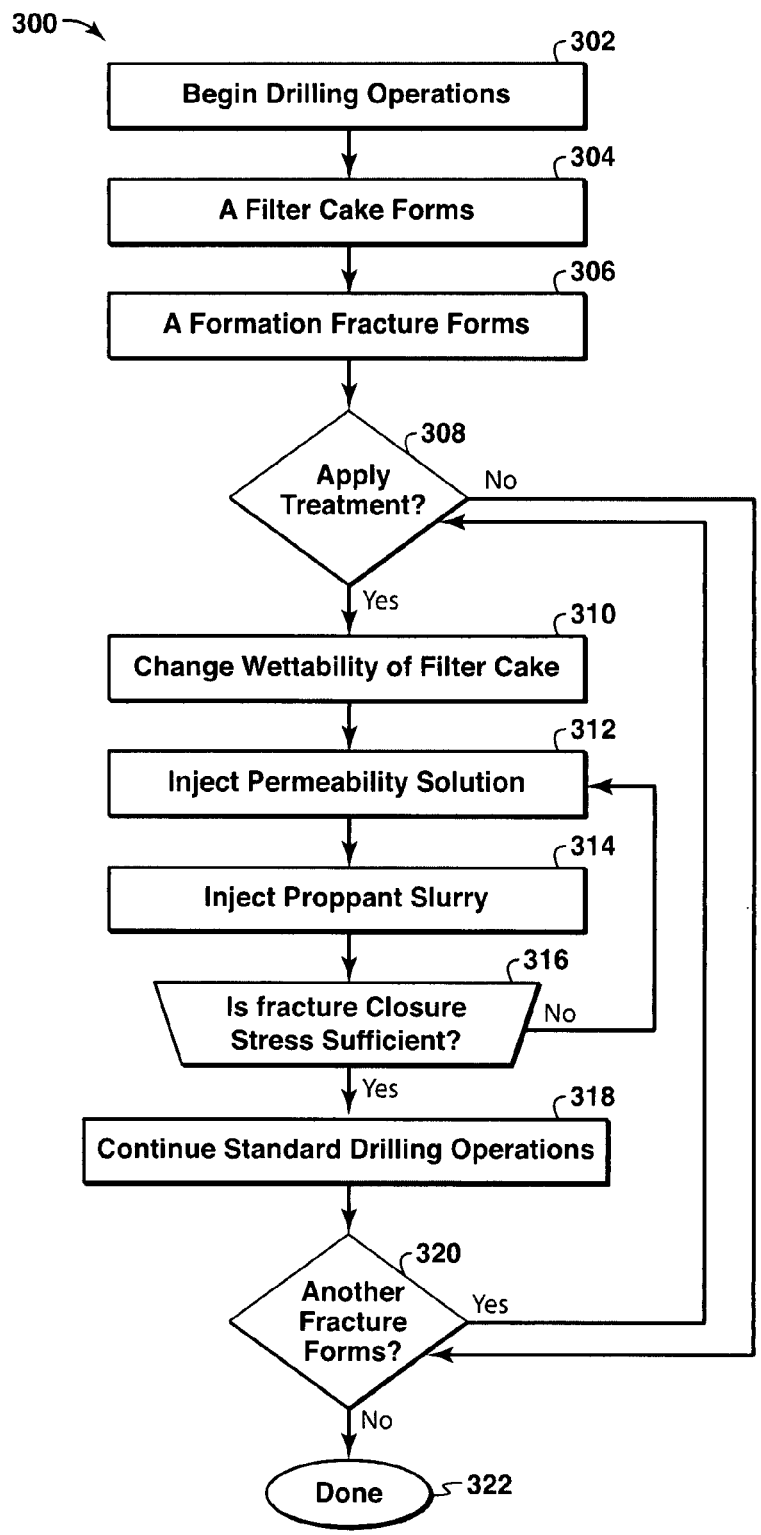
FIG. 3 is an exemplary flow chart of a preferred method of treating lost returns in accordance with certain aspects of the present techniques.

FIG. 3 is an exemplary flow chart of a preferred method of treating lost returns in the well 104 of FIG. 1 including a fracture 200 therein. Accordingly, FIG. 3 may be best understood by concurrently viewing FIGS. 1 and 2A-2B. As depicted in the flow chart, an operator is engaging in drilling operations 302, forming a filter cake 304 when a fracture forms in the wellbore 306. Note, the filter cake forms 304 on the wellbore wall and the face of the fracture 212. The operator may then determine whether treatment is needed 308, and if so, begin treatment before continuing drilling operations 318. The treatment processes include, but are not limited to changing the filter cake wettability, removing metallic weighting agents from the filter cake, and/or solubilizing the NABF, injecting proppants into a fracture, leaking off carrier fluids and elevating temperature and pressure in the wellbore. These and other treatments are more fully described as preferred embodiments below.

In one preferred embodiment of the present techniques, the operator may change the wettability of the filter cake 310 from oil-wet to water-wet, if necessary. The operator may increase the permeability of the filter cake 312 and inject a proppant slurry 314 to increase the fracture closure stress (FCS) to a level sufficient to resume standard drilling operations 318. Note that the steps in the present preferred embodiment may be accomplished concurrently or the permeability may be changed 312 before injecting the proppant slurry 314. It should also be noted that the proppant slurry 314 may comprise sized calcium carbonate, nut hulls, frac sand and any other lost circulation materials. Once the FCS is sufficient 316, the drilling operation may be continued 318 unless or until another fracture forms in the wellbore 320 requiring treatment 308.

A variety of compounds may be utilized to increase the filter cake permeability. As an example, a mutual solvent may be used to change the wettability of the filter cake. Another embodiment to change filter cake wettability may use an organic or inorganic surfactant. An exemplary compound for changing filter cake permeability may be a chelation agent. A chelation agent is herein defined as a chemical used to bind metal ions to stabilize or prevent the precipitation of damaging metal compounds. In the oil field, chelation agents are typically used in stimulation treatments and for cleaning surface facilities. They are not generally used during the drilling process. Typical oilfield chelating agents include EDTA (ethylenediamine tetraacetic acid), HEDTA (hydroxyethylenediamine triacetic acid), DTPA (diethylenetriamine pentaacetic acid), NTA (nitriolotriacetic acid) and citric acid. The preferred chelation agent of the present techniques dissolves barite, which is common in non-aqueous drilling fluid (NADF) and water-based drilling fluids (WBM) and forms a significant portion of the filter cake, although other metallic weighting agents such as hematite and ilmenite may also be present and may be affected by these chelating agents.

In another preferred embodiment, the operator may drill through the zone that needs integrity increase 302. Then, the operator may pump solvent into the wellbore to change the wettability of the filter cake 310. Two preferred solvents are mutual solvent and xylene. More preferably, the mutual solvent may contain 60-100% butyl glycol and may be WT-1040® manufactured by M-I Production Chemicals. Preferably, the concentration is not diluted. The operator may allow the solvent time to soak across the desired formation. One preferred embodiment includes allowing the solution to soak into the filter cake for a period of one minute to one day before applying the permeability solution. In another preferred embodiment, the soaking time is from 10 minutes to two hours, more preferably 30 minutes to one hour.

Once the solvent has sufficiently changed the wettability of the filter cake, the operator may pump the permeability agent 312. This step removes the weighting material of the drilling fluid, which may be barite, hematite, or some other agent. The permeability agent is preferably a chelating agent, such as EDTA (ethylenediamine tetraacetic acid), HEDTA (hydroxyethylenediamine triacetic acid), DTPA (diethylenetriamine pentaacetic acid), NTA (nitriolotriacetic acid) and citric acid. More preferably, a chelating agent such as HDC® MARK II comprising a proprietary mixture of salts and acids; HDC® D17; or HDC® XREAM® (all manufactured by Well-Flow, Int'l) may be used, most preferably using HDC® MARK II. Preferably, the concentration is not diluted. Note that for other weighting materials such as hematite, the preferred chelation agent may be different. The operator may then allow the agent to soak across the desired formation changing the permeability of the filter cake. Although soaking times vary from one environment to another, a period of 10 minutes to one day is preferred, a period of 20 minutes to two hours is more preferred, and a period of 30 minutes to one hour is most preferred. In some implementations, the permeability agent may be heated, either at the surface before injecting the permeability agent into the wellbore or over time in the wellbore due to geothermal heating. Without being bound by theory, it is currently believed that the temperature of the permeability agent is related to the amount of soaking time required to effect the desired permeability increase. Then, the circulating pressure in the wellbore is increased above the fracture pressure. Finally, the operator pumps the proppant slurry 314 until the integrity of the zone has sufficiently increased 316 to continue drilling operations 318.

Some embodiments of the present techniques are proactive and may be applied during a standard drilling operation in which no fracture forms, but the operator desires greater wellbore integrity. One approach to increase wellbore integrity is to intentionally fracture the wellbore and treat it using a process such as Fracture Closure Stress (FCS). If a fracture is formed and properly treated, the overall integrity of the wellbore increases. This may beneficially allow the operator to utilize a higher-weight drilling fluid during drilling operations.

Figure 4:
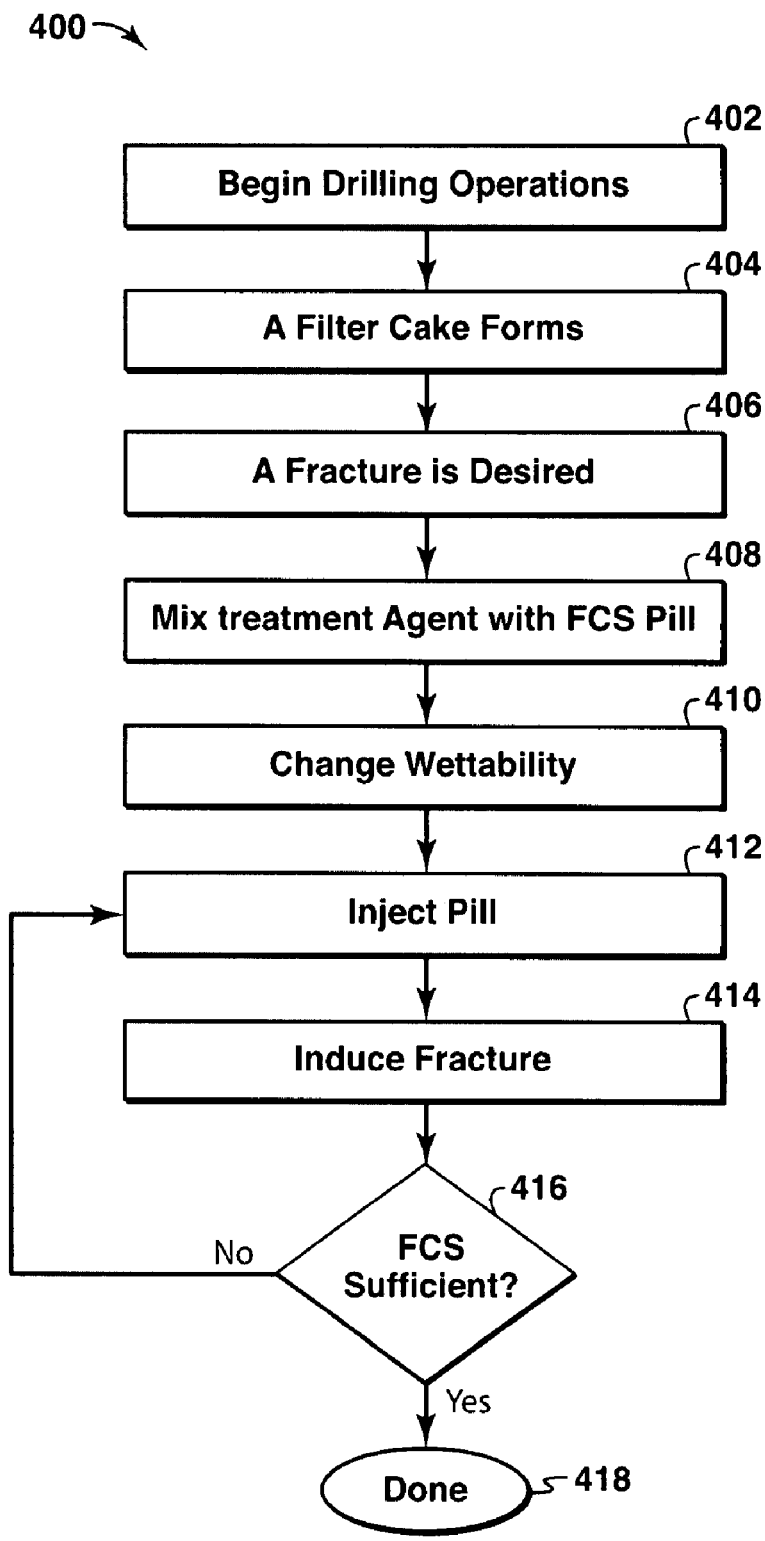
FIG. 4 is an exemplary flow chart of a preferred method of treating lost returns in accordance with certain aspects of the present techniques.

FIG. 4 is an exemplary flow chart of another embodiment of the present techniques for treating lost returns in the well 104 of FIG. 1. Accordingly, FIG. 4 may be best understood by concurrently viewing FIG. 1. As depicted in the flow chart, the treatment according to present techniques may be applied even though no fractures are formed while drilling. This may be the result of using a lower mud weight. As such, the operator may desire to form a fracture in the wellbore 406. An operator may then preferably mix a treating fluid directly with the FCS pill 408, inject the pill into the wellbore 412, depositing an immobile mass and increasing the FCS 416.

Filtrate loss may be increased by directly mixing the treating fluid with the FCS pill. This procedure should induce the weighting particles to go into solution and prevents them from clogging pore throats. The FCS pill may include drilling fluid and sized particles to fill the fracture, but without fluid loss prevention additives. In some embodiments of the present techniques, the operator may change the wettability of the filter cake 410 prior to injecting the FCS pill into the wellbore to create a fracture 412. If a fracture forms 414, the pill deposits an immobile mass in the fracture prior to formation of a filter cake on the fracture face. Preferably, fluid leak-off occurs simultaneously with the deposit of the immobile mass, thus increasing the FCS 416. If successful, this treatment increases the integrity of the wellbore, helps prevent potential lost returns, and enhances the effectiveness of the drilling operations.

An alternative embodiment is to utilize certain aspects of the present techniques between multiple FCS treatments. While performing an FCS treatment it may be that multiple "squeezes" are run to gradually build up the formation integrity by gradually increasing the fracture width of immobile particles. This approach is called a "hesitation squeeze." After each squeeze the fractures may be filled up with the desired propping particles but also permeability-reducing barite and other fine particles. Prior to running the next squeeze, a permeability-increasing agent may be pumped to increase the permeability and make the next squeeze more effective.

Differential Pressure Sticking

Some embodiments of the present techniques may also be applied to differential pressure sticking (DPS). If a NADF (non-aqueous drilling fluid) or WBM (water-based fluid) is used in drilling operations, a filter cake may be formed, which may cause the well tool or pipe to "stick" in the wellbore. The filter cake of the NADF is less likely to encounter this problem, but it may still occur. In some embodiments of the present techniques, filter cake permeability is increased to free a differentially stuck pipe or well tool.

In certain embodiments of the present techniques, the permeability of a filter cake may be increased by removing barite from the portion of the filter cake causing the well tool to stick. More particularly, a filter cake may be treated by changing the wettability and applying a treating fluid or agent, such as a chelation agent, to remove barite, hematite, or other metallic weighting materials from the filter cake, thereby increasing the permeability and freeing the stuck well tool or pipe.

Figure 5:
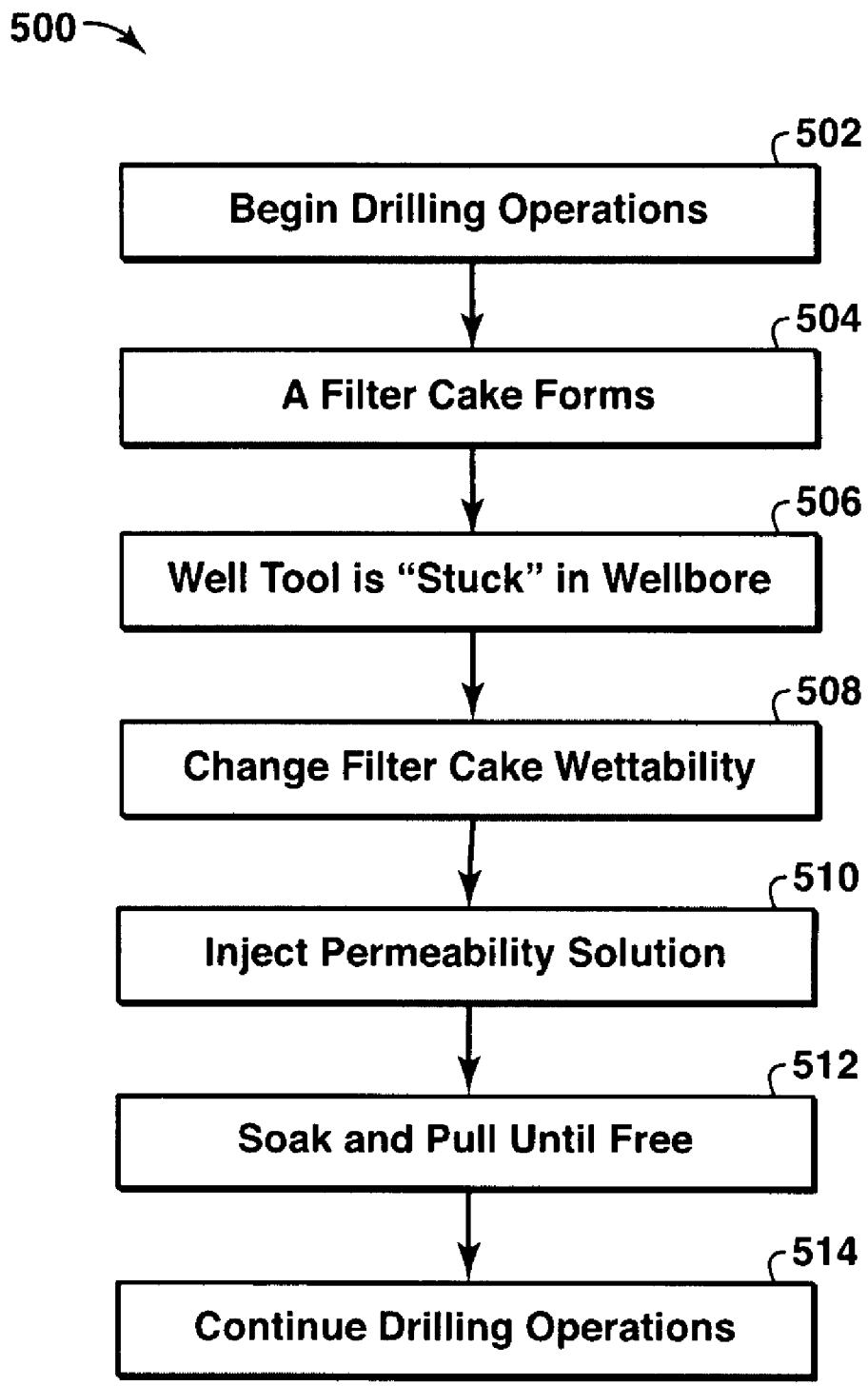
FIG. 5 is an exemplary flow chart of a preferred method of treating differential sticking in accordance with certain aspects of the present techniques.

FIG. 5 is an exemplary flow chart of a preferred method of treating differential pressure sticking of a well tool 107 in the well 104 of FIG. 1. Accordingly, FIG. 5 may be best understood by concurrently viewing FIG. 1. As depicted in the flow chart, the operator may be conducting drilling operations 502, thereby forming a filter cake 504 in the well 104 such that the well tool 107 is stuck 506 by differential pressure sticking. The operator may then increase the filter cake permeability 510 to free the differentially stuck well tool 107 and proceed to soak and pull the stuck well tool 512 until the well tool comes free, then continue drilling operations 514.

In some embodiments of the present techniques, the operator may find it advantageous to inject a solution to change the wettability of the filter cake 508 concurrently with or prior to applying the permeability solution. This step may not be necessary if WBM drilling fluids are being used and may be more advantageous when used with a NADF drilling fluid. One preferred embodiment includes allowing the solution to soak into the filter cake for a period of one minute to one day before applying the permeability solution. In another preferred embodiment, the soaking time is from 10 minutes to two hours, more preferably 30 minutes to one hour. Some exemplary solutions for changing wettability are xylene or a mutual solvent, particularly a mutual solvent comprising 60-100% butyl glycol, more particularly the mutual solvent WT-1040®.

In at least one preferred embodiment of the present techniques, the operator should allow the permeability solution time to soak into the filter cake to change the permeability 510. Although soaking times vary by environment, a period of 10 minutes to one day is preferred, a period of 20 minutes to two hours is more preferred, and a period of 30 minutes to one hour is most preferred. The permeability agent is preferably a chelating agent, such as EDTA (ethylenediamine tetraacetic acid), HEDTA (hydroxyethylenediamine triacetic acid), DTPA (diethylenetriamine pentaacetic acid), NTA (nitriolotriacetic acid) and citric acid. More preferably, a chelating agent such as HDC® MARK II comprising a proprietary mixture of salts and acids; HDC® D17; or HDC XREAM® (all manufactured by Well-Flow, Int'l) may be used, most preferably using HDC® MARK II.

EXAMPLES

Tests were conducted to determine the effectiveness of at least one group of compounds utilized in at least one embodiment of the present techniques. The test results disclosed are exemplary and used only to illustrate certain aspects of the present techniques and do not limit the spirit and scope of the appended claims.

Filter Cake Permeability

Figure 6:
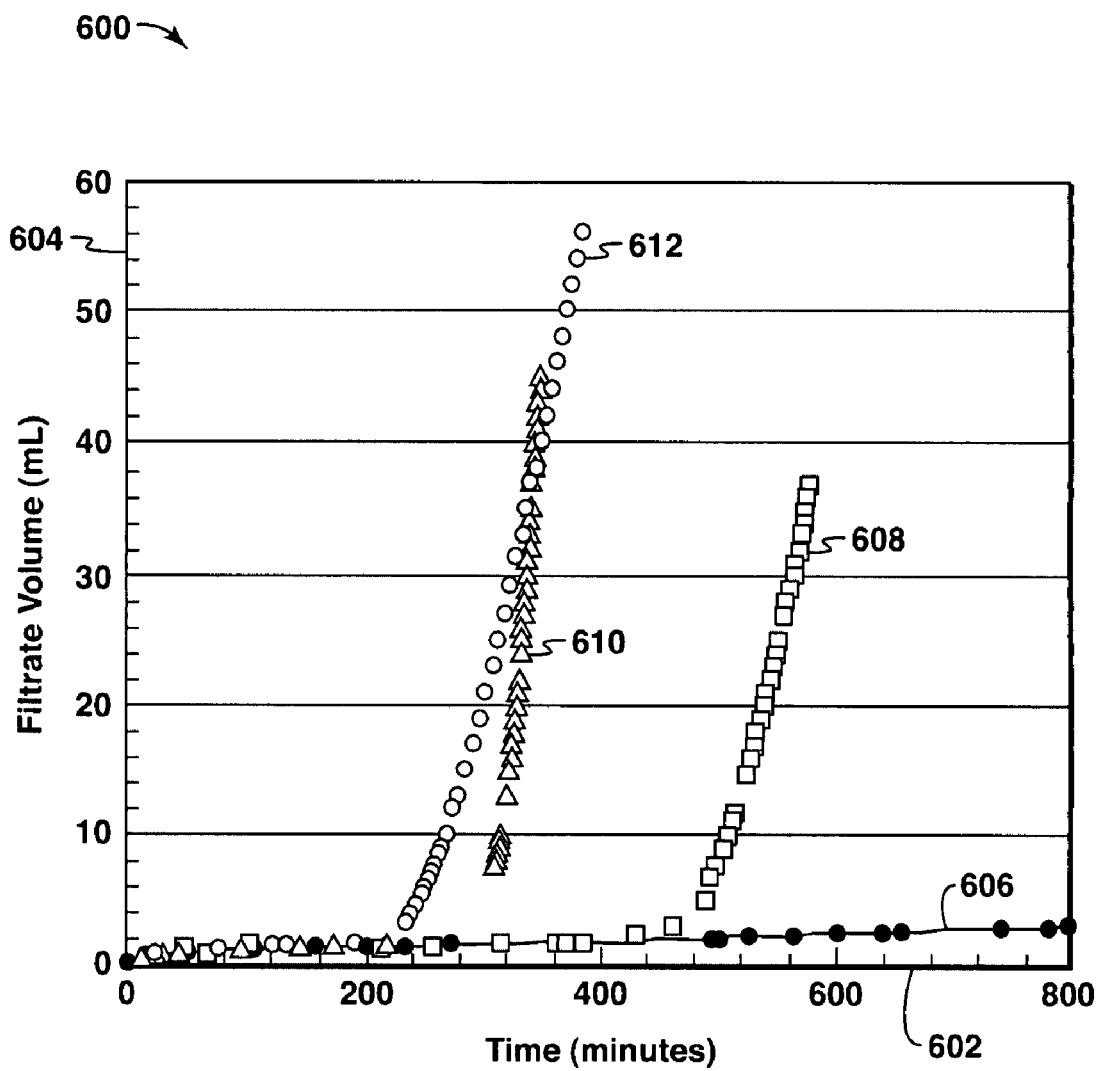
FIG. 6 is an exemplary chart displaying the results of filtrate loss experiments.

FIG. 6 is an exemplary graph displaying the filtrate volume loss over time for three different chelation agents that may be utilized in the processes described in FIGS. 3 and 4. Accordingly, FIG. 6 may be best understood by concurrently viewing FIGS. 3 and 4. The graph 600 includes an abscissa 602 representing time in minutes and an ordinate 604 representing filtrate volume in milliliters. The graph depicts response curves for a base oil 606, HDC® XREAM® 608, HDC® D17 610, HDC® Mark II 612. The base oil 606 is included for comparison purposes.

One test involves a filtration study to show the amount of fluid flowing through a filter cake over a particular time period. First, a filter cake is built up using a representative NADF (a 13 pounds per gallon (ppg) SYN-TEQ® mud with no low gravity solids) on a ceramic disk for approximately two hours at 180 degrees Fahrenheit and 300 pounds per square inch (psi) pressure differential. This may be referred to as a high temperature high pressure (HTHP) fluid loss cell. The NADF is then removed and a solvent placed in the cell. The solvent is allowed to soak through the filter cake and the filtrate volume recorded as a function of time. The solvent flows through the filter cake for at least one hour at room temperature and 300 psi pressure differential. The solvent is then removed from the cell and replaced with a treating fluid. The treating fluid is flowed through the cell for at least one hour at 300 psi pressure differential. Again, the filtrate volume is recorded as a function of time.

The results of the experiment can be seen by concurrently reviewing FIG. 6 and Table 1 below. Steady state was quickly achieved and no change in filter cake permeability occurred during the solvent phase. Then the treating fluids (e.g. chelation agents) were added and filter cake permeability increased significantly over a relatively short time as shown in plots 608, 610, and 612. As a comparison, instead of using a treating fluid, base oil 606 was placed in the cell and it was seen that the response was purely linear—no change in filter cake permeability. Table 1 shows that with certain combinations (solvent, temperature, chelating agent) the filter cake permeability can be increased 852 times (or 85,200 percent) and the activation time as fast as ten minutes. Table 1 below shows results from several different permeability tests. The variables tested are treating fluid, solvent, and temperature during the treating fluid soaking phase. Other tests have indicated that without the solvent step, the response remains linear no matter what treating fluid is used indicating no change in filter cake permeability. Eventually, the filtration rate reaches a steady state when using the treating fluid. Then the slope at steady state can be determined and using Darcy's Law the permeability of the filter cake can be calculated.

TABLE 1

| Agent | Temperature | Solvent | k (md) | Permeability Increase | Activation Time (min) |
|---|---|---|---|---|---|
| HDC Mark II | 250° F. | WT 1040 | 8.33E−02 | 852 | 60 |
| HDC Mark II | 250° F. | Xylene | 5.55E−02 | 567 | 60 |
| HDC D17 | 250° F. | WT 1040 | 2.43E−02 | 248 | 10 |
| HDC D17 | 250° F. | Xylene | 2.13E−02 | 218 | 54 |
| HDC D17 | 70° F. | Xylene | 1.97E−02 | 201 | 358 |
| XREAM | 250° F. | Xylene | 9.45E−03 | 97 | 238 |
| HDC Mark II | 70° F. | Xylene | 7.56E−03 | 77 | 256 |
| XREAM | 70° F. | Xylene | 5.00E−03 | 51 | 495 |
| None | 70° F. | None | 9.78E−05 | 0 | N/A |

Figure 7A:
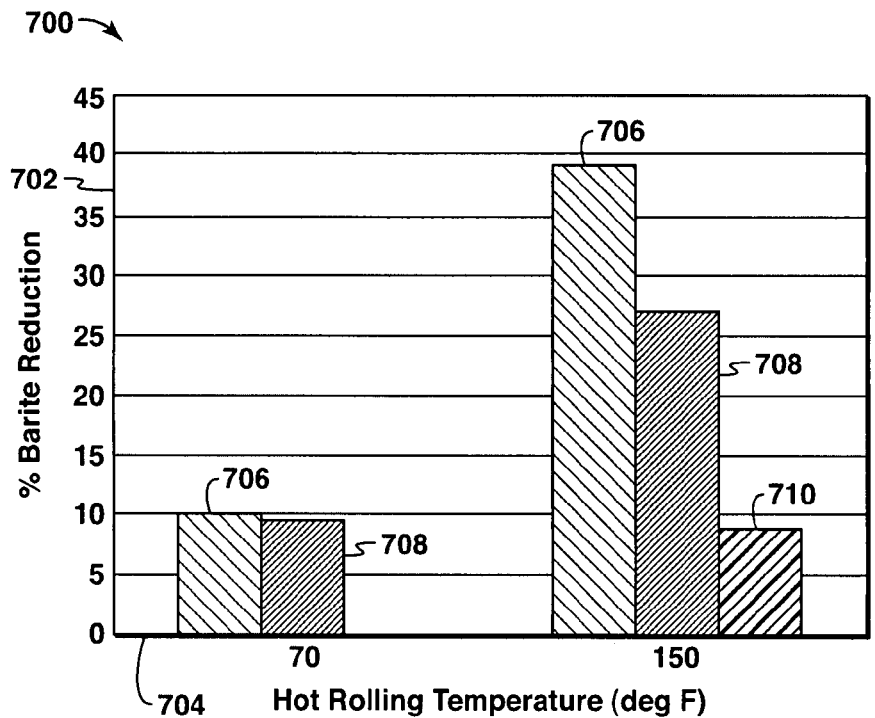
FIGS. 7A-7B are exemplary charts displaying the results of hot rolling experiments.
Figure 7B:
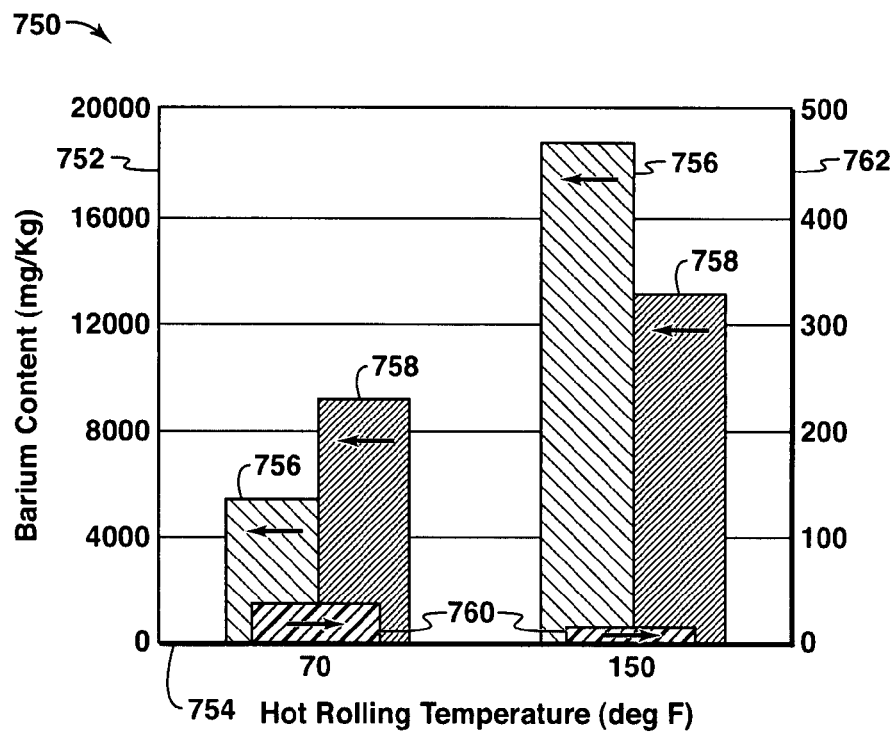

FIGS. 7A-7B are exemplary graphs displaying the results of hot rolling tests for three different chelation agents that might be utilized in either of the processes described in FIGS. 3 and 4. Accordingly, FIGS. 7A-7B may be best understood by concurrently viewing FIGS. 3 and 4. The graph 700 includes an abscissa 704 representing hot rolling temperature in degrees and an ordinate 702 representing percent (%) barite reduction. The graph further shows bars representing the reduction at temperature for HDC® Mark II 706, HDC® XREAM® 708, and HDC® D17 710.

Hot rolling tests were performed on barite powder with one of three treating fluids 706, 708, 710. The barite (10 grams) and agent (80 mL) were mixed together in a plastic bottle and placed in a roller oven for 24 hours. Tests were conducted at room temperature (~70° F.) and 150° F. 704. The mixture was centrifuged, then filtered. The centrifuged solids were then washed and filtered again. Then the solids were allowed to dry and weighed to calculate the mass reduction 702. It can be seen that almost a 40% reduction in barite can be achieved under this procedure at 150° F. 706.

FIG. 7B is a graph 750 showing results of an acid digestion test conducted on the filtered fluid recovered from the hot rolling experiments. The graph 750 consists of a first ordinate 752 showing barium content by weight, a second ordinate 762 showing barium content by weight on a different scale, and an abscissa 754 representing hot rolling temperature in degrees Fahrenheit. The graph further shows bars representing an elemental analysis of barium content by weight for three treating fluids: HDC® Mark II 756, HDC® XREAM® 758, and HDC® D17 760. The results indicate that barite is being removed from the filter cake. The treating fluids 756, 758, and 760 were tested for barium prior to adding barite and were found to contain 0 mg/kg.

Differential Sticking

Differential pressure sticking tests were conducted in a unique differential pressure sticking apparatus ("Stickometer"). The test apparatus comprises a chamber that accommodates a cylindrical core of known permeability. Drilling fluid is circulated throughout the system and a pressure differential of 500 psi is allowed to occur on the core between the "wellbore" and the "formation." A dynamic filter cake is deposited on the walls of the core. Situated within the core is a stainless steel rod that creates an annulus for the fluid to flow through. Once filter cake deposition is completed, the rod can be embedded into the filter cake. The rod also has pressure transducers in it to measure the pressure inside the filter cake. After remaining stationary for a set amount of time, load to free the pipe in an axial direction is applied and the freeing force recorded.

In the tests conducted for these experiments, a generic water-base drilling fluid (WBM) was used rather than the NAF from previous tests. The WBM was used to ensure that a thick filter cake would be formed for the testing which is needed to get the most meaningful pressure data from the transducers. The uses of a WBM should have no effect on the viability of the test. It may be possible to skip the solvent (pre-flush) phase when using a WBM.

After filter cake buildup, the pipe was embedded and the pressure recorded as a function of time. The solvent (xylene in this test) was then spotted into the chamber and allowed to filter in the chamber for approximately 30 minutes. Finally, the treating fluid (HDC® Mark II) was spotted into the chamber. The transducer records pressure at all times. All tests were conducted at approximately 75° F.

Figure 8A:
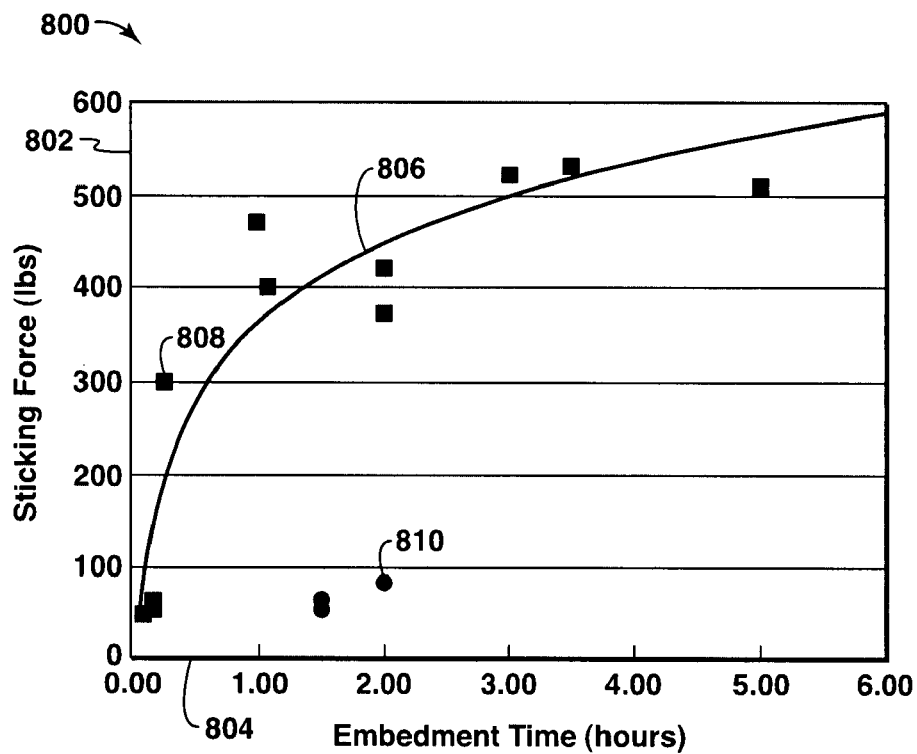
FIGS. 8A-8B are exemplary charts displaying the results of differential sticking experiments.
Figure 8B:
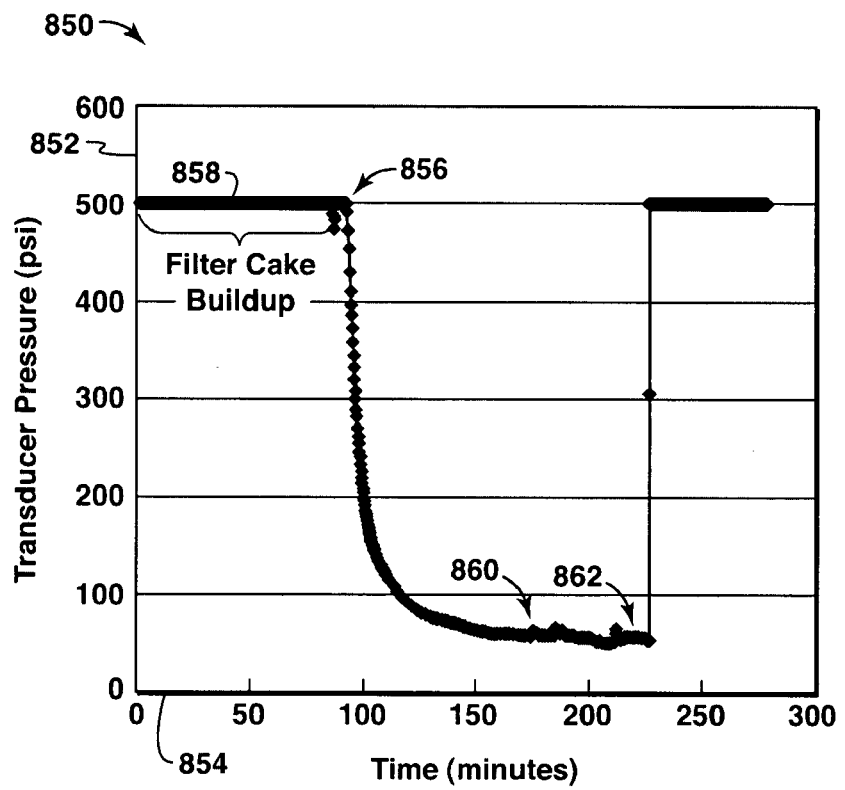

FIGS. 8A-8B are exemplary graphs displaying the results of differential pressure sticking tests for an exemplary treating fluid that might be utilized in either of the processes described in FIGS. 3 and 4. Accordingly, FIGS. 8A-8B may be best understood by concurrently viewing FIGS. 3 and 4. FIG. 8A displays a graph 800 having an ordinate 802 showing sticking force in pounds and an abscissa 804 showing time in hours. The plot 806 shows the increase in force over time without treatment, based on the data points 808 as compared to the treatment data points 810.

It can be seen from a comparison of the plot 806 and the treatment data points 810 that the sticking force 802 in the apparatus is greatly reduced when using the spotting treatment of solvent and treating fluid. For a 2-hour embedment, the sticking force 802 was reduced approximately 80% by using the spotting treatment compared to no treatment.

FIG. 8B displays a graph 850 having an ordinate 852 showing transducer pressure in pounds per square inch (psi), an abscissa showing 854 showing time in minutes, and a plot 858 showing pressure responses to various conditions. Initially, the pressure is steady at 500 psi while the filter cake builds up, then the pipe "sticks" or embeds 856 and the pressure beneath the embedded pipe begins to decrease and thus a pressure differential is formed. However, upon addition of a solvent 860 and a treating fluid 862 into the chamber the pressure begins to increase and eventually returns to 500 psi, the pressure in the chamber. Hence, the increase in filter cake permeability appears to eliminate the pressure differential and free the stuck pipe.

The control test using only solvent without treating fluid exhibited no increase in pressure beneath the pipe after four hours of treatment. Additionally, no reduction in sticking force was measured. It can be concluded that the pressure response and sticking force reduction are due solely to the barite chelation behavior of the agent and that the solvent only ensures compatibility between the treating fluid and the filter cake.

It should be noted that the present techniques should also be effective with WBM filter cakes, which may not require a solvent since such filter cakes are already water-wet. Additionally, agents that treat particles other than barite, such as hematite, ilmenite, and other metallic weighting particles may be used. Further, treating fluids may include agents other than chelating agents, such as potassium formate.

While the present techniques of the invention may be susceptible to various modifications and alternative forms, the exemplary embodiments discussed above have been shown only by way of example. However, it should again be understood that the invention is not intended to be limited to the particular embodiments disclosed herein. Indeed, the present techniques of the invention include all alternatives, modifications, and equivalents falling within the true spirit and scope of the invention as defined by the following appended claims.

What is claimed is:

1. A method of managing lost returns in a wellbore comprising:
   contacting a filter cake with a treating fluid to remove metallic weighting agents from the filter cake, wherein the filter cake is disposed on a face of a formation fracture in the wellbore; and
   contacting the filter cake with a proppant slurry, wherein the proppant slurry contacts the filter cake concurrently with the treating fluid or after the treating fluid contacts the filter cake.

2. The method of claim 1 wherein the treating fluid is adapted to increase the permeability of the filter cake.

3. The method of claim 2 wherein the treating fluid comprises a chelating agent.

4. The method of claim 3 wherein the chelating agent is selected from the group consisting of ethylenediamine tetraacetic acid, hydroxyethylenediamine triacetic acid, diethylenetriamine pentaacetic acid, nitriolotriacetic acid, citric acid, and mixtures thereof.

5. The method of claim 1 further comprising contacting the filter cake with a solvent, wherein the solvent is capable of changing the filter cake wettability.

6. The method of claim 5 wherein the solvent contacts the filter cake concurrently with the treating fluid or before the treating fluid contacts the filter cake.

7. The method of claim 6 wherein the solvent is selected from the group consisting of xylene and mutual solvent.

8. The method of claim 1 further comprising elevating the temperature of the treating fluid.

9. The method of claim 1 wherein the filter cake is formed using non-aqueous drilling fluids (NADF).

10. A method of managing drilling operations comprising:
    creating a fracture in a wellbore, having a filter cake with a low permeability disposed on a wall of the wellbore, wherein creating a fracture comprises pumping a mixture into the wellbore, the mixture comprising a proppant slurry and a treating fluid, wherein the treating fluid is capable of removing metallic weighting agents from the filter cake.

11. The method of claim 10 wherein at least one component of the mixture is selected to increase the permeability of the filter cake.

12. The method of claim 10 wherein the treating agent comprises a chelating agent.

13. The method of claim 12 wherein the chelating agent is selected from the group consisting of ethylenediamine tetraacetic acid, hydroxyethylenediamine triacetic acid, diethylenetriamine pentaacetic acid, nitriolotriacetic acid, and citric acid.

14. A method of producing hydrocarbons from a well comprising:
    forming a fracture in a formation, wherein a filter cake forms on a face of the fracture;
    treating the fracture, the treating comprising pumping a treating fluid over the filter cake on the face of the fracture, wherein the treating fluid is capable of removing metallic weighting agents from the filter cake, and pumping a proppant slurry into the fracture, wherein the treating fluid is pumped concurrently or prior to the proppant slurry; and
    producing hydrocarbons from the well.

15. The method of claim 14 wherein the treating fluid comprises a chelating agent.

16. The method of claim 15 wherein the chelating agent is selected from the group consisting of ethylenediamine tetraacetic acid, hydroxyethylenediamine triacetic acid, diethylenetriamine pentaacetic acid, nitriolotriacetic acid, citric acid, and mixtures thereof.

17. The method of claim 14 further comprising contacting the filter cake with a solvent, wherein the solvent is capable of changing the filter cake wettability.

18. The method of claim 17 wherein the treating fluid contacts the filter cake concurrently with the solvent or after the solvent contacts the filter cake.

19. The method of claim 14 further comprising elevating the temperature of the treating fluid.

20. The method of claim 14 wherein the filter cake is formed using non-aqueous drilling fluid (NADF).

21. The method of claim 14 further comprising disposing proppant from the proppant slurry into the fracture, wherein the proppant slurry has a carrier fluid and the carrier fluid leaks off of the proppant.

22. The method of claim 21 wherein the proppant forms an immobile mass inside the fracture.

23. The method of claim 14 comprising increasing the integrity of the wellbore by utilizing a fracture closure stress method.

24. The method of claim 23, wherein the fracture closure stress method comprises determining a fracture pressure at a location of the formation fracture in the wellbore, increasing circulating pressure in the wellbore above the fracture pressure until an immobile mass forms inside the formation fracture and the fracture pressure is equal to or above the circulating pressure.

* * * * *